July 30, 1940.　　L. SCHALM ET AL　　2,209,543
APPARATUS FOR SUBJECTIVE EXAMINATION OF BLOOD
Filed Feb. 23, 1938
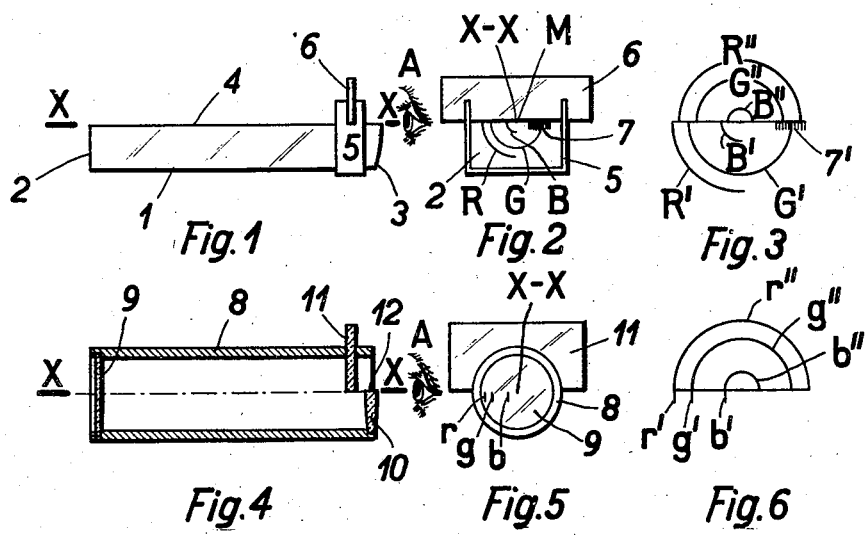
Inventors:
L. Schalm
J. F. Schouten Patented July 30, 1940

2,209,543

UNITED STATES PATENT OFFICE 2,209,543

APPARATUS FOR SUBJECTIVE EXAMINATION OF BLOOD

Leendert Schalm and Jan Frederik Schouten, Utrecht, Netherlands, assignors to the firm Carl Zeiss, Jena, Germany Application February 23, 1938, Serial No. 192,112
In Germany March 2, 1937

3 Claims. (Cl. 88—14)

Application has been filed in Germany March 2, 1937.

The objective diagnosis of blood is effected in hospitals by means of an apparatus according to Dr. Pijper, in which the diffraction rings of two blood smears are projected on a ground glass plate in such reciprocal positions that isochromatic diffraction rings can be compared as to their sizes. This testing apparatus provides very good results, but its dimensions prohibit physicians to carry it along with themselves when visiting patients in their homes.

The invention aims at providing a handy blood-cell testing apparatus which is especially simple in construction and permits subjective examination of blood and which physicians can carry in their pocket.

The apparatus has to this effect a half-lens forming an image of a scale whose zero point corresponds to the centre of the diffraction rings due to illumination of a comparison blood smear in transmitted light, and whose other division points correspond to the points of intersection of the medial circles of these diffraction rings and a diameter of these rings which is parallel to the plane bounding surface of the half-lens, the said image having the size in which the said scale would be seen by the naked eye viewing the comparision blood smear itself. Moreover, the apparatus has a construction permitting the image of the scale and parts of the diffraction rings of the blood smear under examination to be seen simultaneously in positions in which the centre of said rings coincides with the zero point of the scale, the magnitude of the erythrocytes of the blood smear being found by comparison of the image of the scale and the magnitudes of the radii of the diffraction rings of the blood smear.

To measure the difference in length between the radius of a definite, for instance the yellow, diffraction ring of the blood smear to be examined and the distance apart of the image of the zero point of the scale and the image of the division point corresponding to the medial circle of the diffraction ring of like colour of the comparison blood smear, it is advisable to use another scale, which is linear and suitably positioned with respect to the first said scale.

In the simplest case, the diffraction rings of the blood smear to be examined can be produced by holding this smear near the eye against a distant source of light (an ordinary reading lamp).

The accompanying drawing illustrates two constructional examples of an apparatus according to the invention, the first example being represented by Figures 1 and 2 and the second by Figures 4 and 5. Figure 1 is an elevational view, Figure 4 is a longitudinal section, and Figures 2 and 5 are side views of the mark plate of the apparatus. Figures 3 and 6 illustrate the image which the scale of the apparatus and the diffraction rings peculiar to the blood smear to be examined offer the examiner's eye in the first and the second example, respectively.

In Figures 1 and 2, 1 is a glass staff of rectangular cross-section. The face 2 of the staff 1 is at right angles to the longitudinal axis of same, and the face 3 is a part of the surface of a lens whose optical axis X—X lies in the lateral surface 4 of the staff 1. 5 is a support for a glass plate 6. The face 2 bears three circular lines R, B and G concentric to a point M in the optical axis X—X. R and B are quadrants, and G is a semi-circle. The face 2 is provided also with a linear scale 7, a portion of this scale being disposed on the diameter of the semi-circle G. The lens surface 3 has such a radius of curvature and the circular lines R, G and B have such radii that an observer's eye A is offered the view of a sharp image of circular lines which are of the magnitudes in which the medial circles of simultaneously visible red, yellow and blue diffraction rings would appear to the eye A looking at the glass plate 6 illuminated by a distant light-source if this plate were provided with a smear of blood having normal-sized erythrocytes.

The apparatus is used as follows. The glass plate 6 is provided with a smear of the blood to be examiner, and the glass staff 1 is so held against a distant light source that the observer's eye A (cf. Figure 3) is offered the view of the diffraction rings which are peculiar to the blood under examination (and the medial circles R", G" and B" of whose red, yellow and blue rings, respectively, are shown in Figure 3 of the drawing) and that the eye A sees simultaneously therewith images R', G' and B' of the circular lines R, G and B, respectively, and an image 7' of the scale 7. In Figure 3, it is assumed that the erythrocytes of the blood to be examined are too great, which follows from the diameters of R", G" and B" being smaller than the diameters of R', G' and B'. The difference of the radii of G" and G' can be read on the image 7' of the scale 7.

In the blood-cell tester according to Figures 4 and 5, a cylindrical tube 8 contains in its two ends a mark plate 9 and a half-lens 10, respectively. In the tube 8 is a slit for the insertion of a glass plate 11 into that part of the field of view which is not occupied by the half-lens 10. The mark plate 9 has on a straight line lying in the plane containing the optical axis X—X and the plane surface 12 of the half-lens 10 three division lines $r$, $g$ and $b$ which, when the glass plate 11 is provided with a smear of blood having normal-sized erythrocytes and the observer holds the tube 8 against a distant light source, are imaged in the eye A of the observer by the half-lens 10 sharply, so as to appear to the observer as tangents $r'$, $g'$ and $b'$ to the medial circles $r''$, $g''$ and $b''$, respectively, of the red, yellow and blue diffraction rings, respectively, which are presented to the observer's view at the same time. This case is shown in Figure 6. When, in the test of the smear of the blood under examination, the images $r'$, $g'$ and $b'$ of the division lines $r$, $g$ and $b$, respectively, differ from the tangents to the said medial circles, this difference is indicative of the said blood not being in order.

We claim:

1. A pocket apparatus for subjective determination of the size of blood corpuscles, comprising a half-lens, a transparent mark plate, one surface of said plate lying in the focal plane of said half-lens and being provided with a non-linear scale, said half-lens and said scale lying on one side of an axial plane containing the optical axis and the plane bounding surface of said half-lens, means for rigidly connecting said plate to said half-lens and having means for holding a transparent blood-smear carrier near said half-lens, said carrier and said half-lens lying on opposite sides of said axial plane and permitting a simultaneous view of an image of said scale and the diffraction rings due to an illumination in transmitted light of blood smeared on said carrier, the division lines of said scale originating in said plane, and the images of said division lines coinciding with the diffraction rings formed by a smear of blood having erythrocytes of normal size.

2. A pocket apparatus for subjective determination of the size of blood corpuscles, comprising a half-lens, a transparent mark plate, one surface of said plate lying in the focal plane of said half-lens and being provided with a non-linear scale, said half lens and said scale lying on one side of an axial plane containing the optical axis and the plane bounding surface of said half-lens, means for rigidly connecting said plate to said half-lens and having means for holding a transparent blood-smear carrier near said half-lens, said carrier and said half-lens lying on opposite sides of said axial plane and permitting a simultaneous view of an image of said scale and the diffraction rings due to an illumination in transmitted light of blood smeared on said carrier, the division lines of said scale constituting concentric circular curves originating in said plane, and the images of said division lines coinciding with the diffraction rings formed by a smear of blood having erythrocytes of normal size.

3. A pocket apparatus for subjective determination of the size of blood corpuscles, comprising a half-lens, a transparent mark plate, one surface of said plate lying in the focal plane of said half-lens and being provided with a linear scale and a non-linear scale, said half-lens and said two scales lying on one side of an axial plane containing the optical axis and the plane bounding surface of said half-lens, means for rigidly connecting said plate to said half-lens and having means for holding a transparent blood-smear carrier near said half-lens, said carrier and said half-lens lying on opposite sides of said axial plane and permitting a simultaneous view of an image of said scales and the diffraction rings due to an illumination in transmitted light of blood smeared on said carrier, the division lines of said scales originating in said plane, the point of origin of a division line of one of said scales coinciding with the point of origin of a division line of the other scale, and the images of the division lines of said non-linear scale coinciding with the diffraction rings formed by a smear of blood having erythrocytes of normal size.

L. SCHALM.
J. F. SCHOUTEN.